US008798164B2

(12) United States Patent
Zhu

(10) Patent No.: US 8,798,164 B2
(45) Date of Patent: Aug. 5, 2014

(54) SYSTEM AND METHOD FOR AUTOMATIC FILTER GENERATION USING SAMPLED SINC FUNCTION WITH WINDOWED SMOOTHING

(75) Inventor: Qin-Fan Zhu, Acton, MA (US)

(73) Assignee: Broadcom Corporation, Irvine, CA (US)

( * ) Notice: Subject to any disclaimer, the term of this patent is extended or adjusted under 35 U.S.C. 154(b) by 244 days.

(21) Appl. No.: 12/852,909

(22) Filed: Aug. 9, 2010

(65) Prior Publication Data

US 2010/0302448 A1    Dec. 2, 2010

Related U.S. Application Data

(63) Continuation of application No. 11/013,768, filed on Dec. 16, 2004, now Pat. No. 7,817,726.

(60) Provisional application No. 60/573,523, filed on May 21, 2004.

(51) Int. Cl.
*H04N 11/02* (2006.01)
*H04B 1/66* (2006.01)
*H04B 14/06* (2006.01)

(52) U.S. Cl.
USPC ...................................... 375/240.25; 375/250

(58) Field of Classification Search
USPC ............................................ 375/240.25, 250
See application file for complete search history.

(56) References Cited

U.S. PATENT DOCUMENTS

| 4,797,942 | A  | * | 1/1989 | Burt ............................... 382/284 |
| 5,231,680 | A  | * | 7/1993 | Williams ........................ 382/261 |
| 6,014,682 | A  | * | 1/2000 | Stephen et al. ................ 708/313 |
| 6,501,484 | B1 | * | 12/2002 | Porter ............................ 345/667 |
| 6,711,301 | B1 | * | 3/2004 | Tran et al. ...................... 382/260 |
| 6,714,692 | B1 | * | 3/2004 | Kim et al. ...................... 382/299 |
| 7,149,369 | B2 | * | 12/2006 | Atkins ........................... 382/299 |
| 7,333,141 | B2 | * | 2/2008 | Hung ......................... 348/240.2 |
| 7,876,378 | B1 | * | 1/2011 | Lew et al. .................. 348/420.1 |
| 2003/0058944 | A1 | * | 3/2003 | MacInnis et al. ......... 375/240.13 |
| 2003/0206664 | A1 | * | 11/2003 | Gomila et al. ................ 382/268 |
| 2004/0113922 | A1 | * | 6/2004 | Choe et al. .................... 345/613 |

* cited by examiner

*Primary Examiner* — Anner Holder
(74) *Attorney, Agent, or Firm* — Brinks Gilson & Lione

(57) ABSTRACT

Methods and systems for processing a plurality of pixels, in a video system, are disclosed. Aspects of the method may comprise acquiring scaling factors associated with a plurality of output pixels and generating filter coefficients during the generation of the output pixels. The filter coefficients may be utilized to filter a plurality of pixels to produce the plurality of output pixels. The filter coefficient may be generated on the fly utilizing a windowed sinc function corresponding to the scaling factors. The sine function may be sampled according to the needed number of filter taps to determine the filter coefficients.

17 Claims, 8 Drawing Sheets

SYSTEM AND METHOD FOR AUTOMATIC FILTER GENERATION USING SAMPLED SINC FUNCTION WITH WINDOWED SMOOTHING

RELATED APPLICATIONS

This patent application makes reference to, claims priority to and claims benefit from U.S. Provisional Patent Application Ser. No. 60/573,523, entitled "System and Method for Automatic Filter Generation Using Sampled SINC Function with Windowed Smoothing," filed on May 21, 2004, the complete subject matter of which is hereby incorporated herein by reference, in its entirety.

This application is related to the following applications, each of which is incorporated herein by reference in its entirety for all purposes:
U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004;

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

After an elementary video stream is decoded within a video decoder, the decoded video stream may be post-processed by a display engine and subsequently communicated to a video display, for example. As part of the post-processing functionality of a display engine, a decoded video signal may be scaled in a vertical and/or in a horizontal direction. Scaling may be utilized within the display engine to change the horizontal to vertical pixel ratio, for example, so that the decoded video signal may be conformed to the horizontal to vertical pixel ratio of the video display.

In a conventional image scaler with a scaling ratio of M:N, a poly-phase filter may be utilized to generate N number of output pixels from M number of input pixels. The value N may be used to determine the number of possible phases for a given output pixel, as well as the type of filter that may be used to achieve a scaling ratio of M:N. A p-tap filter, for example, may indicate that p number of filter inputs may be utilized to generate a single filter output. During conventional scaling of a video signal, the number of possible phases for a given output pixel may be calculated on the fly. In addition, determining which input pixels may be used to generate each output pixel may also be achieved on the fly. In this way, conventional scaling may require significant implementation complexity, and may lead to calculation of inaccurate phase values due to a finite arithmetic precision when calculations are made on the fly.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that process a plurality of pixels. The method may comprise acquiring a scaling factor associated with a plurality of output pixels and generating filter coefficients that correspond to the plurality of output pixels during the generation of the plurality of output pixels. Generating the filter coefficients may comprise generating a sinc function corresponding to the scaling factor; windowing the generated sinc function; and sampling the windowed sinc function according to a number of taps associated with the plurality of output pixels.

The method may further comprise generating the plurality of output pixels utilizing the plurality of pixels and filtering the plurality of pixels utilizing the generated filter coefficients.

In an embodiment of the present invention, the plurality of pixels may comprise video data.

The system may comprise at least one processor capable of performing the method that processes a plurality of pixels.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to a method and system for processing an encoded video stream. More specifically, the present invention relates to reducing image scaling complexity by utilizing an increment value table and a filter coefficient table. The increment value table and filter coefficient table may be generated on the fly based on the scaling factor and the number of taps needed. While the following discusses the method and system in association with one video standard, it should be understood that such techniques as discussed here may be slightly modified, if necessary, to accommodate data encoded using any of the available and future standards.

For example, a p-tap filter may be used to generate one output pixel from a p number of input pixels during scaling. An increment value may be utilized to select the p number of input pixels. The selected input pixels may be insufficient for the p-tap to generate an output pixel. In this case, one or more input pixels may be mirrored and/or replicated so that the p-tap filter may use a total of p number of input pixels to generate one output pixel. The filter coefficients may then be utilized to calculate the p-tap filter output from the selected p number of input pixels. The increment value table and the filter coefficient table may change each time the scaling ratio changes. In this way, if a scaling ratio changes during scaling, the increment value table and the filter coefficient table may be updated.

A video stream may be encoded using an encoding scheme such as the encoder described by U.S. patent application Ser. No. 10/963,677 filed Oct. 13, 2004 entitled "Video Decoder with Deblocker within Decoding Loop." Accordingly, U.S. patent application Ser. No. 10/963,677 filed Oct. 13, 2004 is hereby incorporated herein by reference in its entirety.

Figure 1:
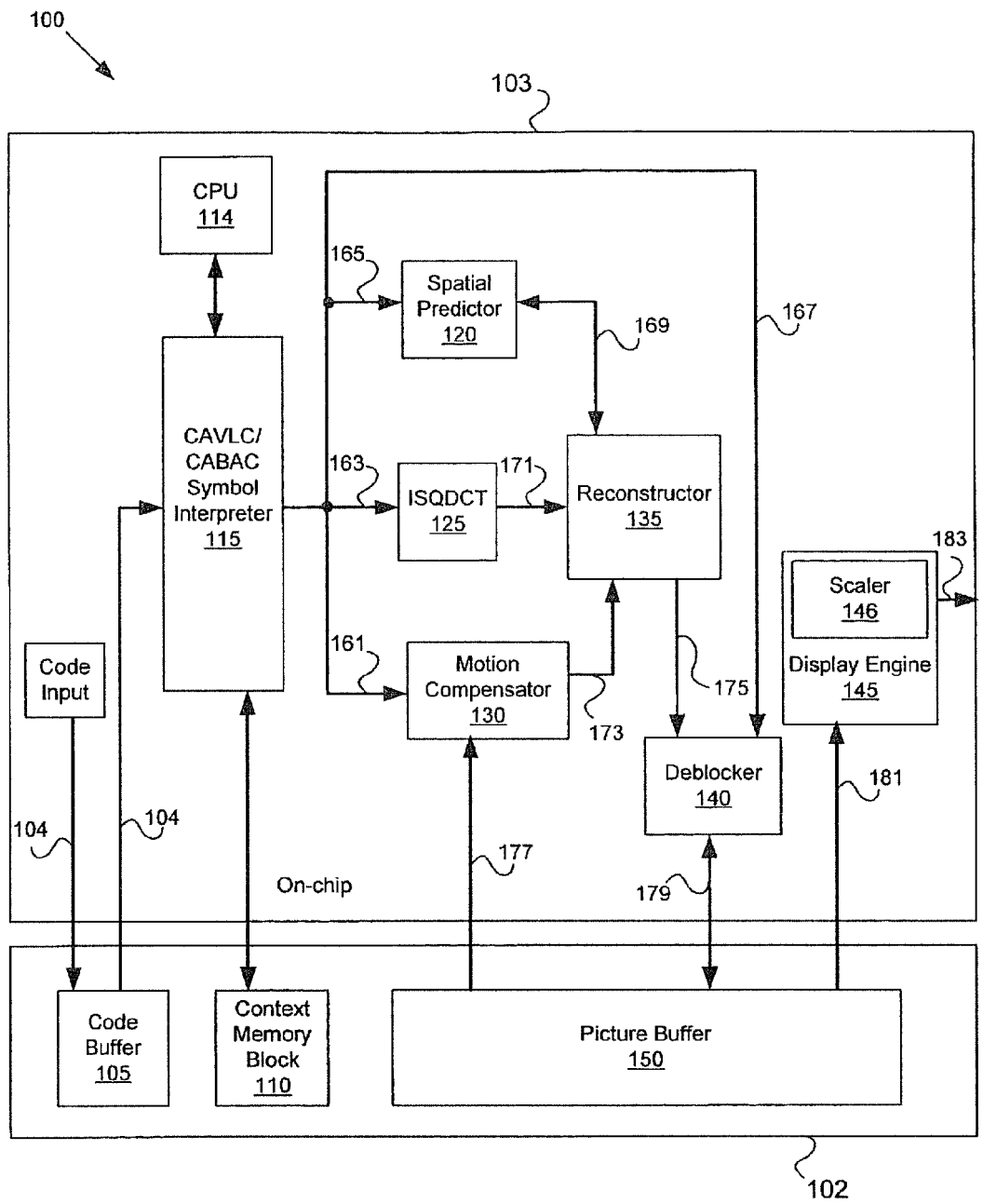
FIG. 1 illustrates a block diagram of an exemplary video decoder, in accordance with an embodiment of the present invention.

FIG. 1 illustrates a block diagram of an exemplary video decoder 100, in accordance with an embodiment of the present invention. The video decoder 100 may comprise a code buffer 105, a symbol interpreter 115, a context memory block 110, a CPU 114, a spatial predictor 120, an inverse scanner, quantizer, and transformer (ISQDCT) 125, a motion compensator 130, a reconstructor 135, a deblocker 140, a picture buffer 150, and a display engine 145. U.S. patent application Ser. No. 10/963,677 filed Oct. 13, 2004, more fully discloses a video decoder with a deblocker within a decoding loop.

The code buffer 105 may comprise suitable circuitry, logic and/or code and may be adapted to receive and buffer the video elementary stream 104 prior to interpreting it by the symbol interpreter 115. The video elementary stream 104 may be encoded in a binary format using CABAC or CAVLC, for example. Depending on the encoding method, the code buffer 105 may be adapted to output different lengths of the elementary video stream as may be required by the symbol interpreter 115. The code buffer 105 may comprise a portion of a memory system such as, for example, a dynamic random access memory (DRAM).

The symbol interpreter 115 may comprise suitable circuitry, logic and/or code and may be adapted to interpret the elementary video stream 104 to obtain quantized frequency coefficients information and additional side information necessary for decoding the elementary video stream 104. The symbol interpreter 115 may also be adapted to interpret either CABAC or CAVLC encoded video stream, for example. In an embodiment of the present invention, the symbol interpreter 115 may comprise a CAVLC decoder and a CABAC decoder. Quantized frequency coefficients 163 may be communicated to the ISQDCT 125, and the side information 161 and 165 may be communicated to the motion compensator 130 and the spatial predictor 120, respectively. Depending on the prediction mode for each macroblock associated with an interpreted set of quantized frequency coefficients 163, the symbol interpreter 115 may provide side information either to a spatial predictor 120, if spatial prediction was used during encoding, or to a motion compensator 130, if temporal prediction was used during encoding. The side information 161 and 165 may comprise prediction mode information and/or motion vector information, for example.

In order to increase processing efficiency, a CPU 114 may be coupled to the symbol interpreter 115 to coordinate the interpreting process for each macroblock within the bitstream 104. In addition, the symbol interpreter 115 may be coupled to a context memory block 110. The context memory block 110 may be adapted to store a plurality of contexts that may be utilized for interpreting the CABAC and/or CAVLC-encoded bitstream. The context memory 110 may be another portion of the same memory system as the code buffer 405, or a portion of another memory system, for example.

After interpreting by the symbol interpreter 115, sets of quantized frequency coefficients 163 may be communicated to the ISQDCT 125. The ISQDCT 125 may comprise suitable circuitry, logic and/or code and may be adapted to generate the prediction error E 171 from a set of quantized frequency coefficients received from the symbol interpreter 115. For example, the ISQDCT 125 may be adapted to transform the quantized frequency coefficients 163 back to spatial domain using an inverse transform. After the prediction error E 171 is generated, it may be communicated to the reconstructor 135.

The spatial predictor 120 and the motion compensator 130 may comprise suitable circuitry, logic and/or code and may be adapted to generate prediction pixels 169 and 173, respectively, utilizing side information received from the symbol interpreter 115. For example, the spatial predictor 120 may generate the prediction pixels P 169 for spatially predicted macroblocks, while the motion compensator 130 may generate prediction pixels P 173 for temporally predicted macroblocks. The prediction pixels P 173 may comprise prediction pixels $P_0$ and $P_1$, for example, associated with motion compensation vectors in frames/fields neighboring a current frame/field. The motion compensator 130 may retrieve the prediction pixels $P_0$ and $P_1$ from the picture buffer 150 via the connection 177. The picture buffer 150 may store previously decoded frames or fields.

The reconstructor 135 may comprise suitable circuitry, logic and/or code and may be adapted to receive the prediction error E 171 from the ISQDCT 125, as well as the prediction pixels 173 and 169 from either the motion compensator 130 or the spatial predictor 120, respectively. The pixel reconstructor 135 may then reconstruct a macroblock 175 from the prediction error 171 and the side information 169 or 173. The reconstructed macroblock 175 may then be communicated to a deblocker 140, within the decoder 100.

If the spatial predictor 120 is utilized for generating prediction pixels, reconstructed macroblocks may be communicated back from the reconstructor 135 to the spatial predictor 120. In this way, the spatial predictor 120 may utilize pixel information along a left, a corner or a top border with a neighboring macroblock to obtain pixel estimation within a current macroblock.

The deblocker 140 may comprise suitable circuitry, logic and/or code and may be adapted to filter the reconstructed macroblock 175 received from the reconstructor 135 to reduce artifacts in the decoded video stream.

During encoding of a video stream, prediction error information may be transformed to quantized frequency coefficients utilizing a discrete cosine transformation, for example. During the transformation and compression process within a video encoder, certain information within the quantized frequency coefficients may be lost. As a result, after quantized frequency coefficients are transformed back to prediction error information and a macroblock is reconstructed utilizing the generated prediction error information and prediction pixels information, certain artifacts may appear in the decoded video stream. For example, transform blockiness may appear in the decoded video stream. Transform blockiness effect may be associated with missing pixel information along one or more borders between neighboring macroblocks.

After receiving a reconstructed macroblock 175 from the reconstructor 135, the deblocker 140 may filter the reconstructed macroblock so as to mitigate the transform blockiness effect. In one aspect of the invention, the deblocker 140 may comprise a filter adapted to reduce the amount of missing pixel information along one or more borders between neighboring macroblocks. For example, the deblocker 140 may smooth pixels at the edge of a macroblock to prevent the appearance of blocking. The deblocked macroblocks may be communicated via the connection 179 to the picture buffer 150.

Certain information related to the side information 161 and 165, as well as information related to the quantized frequency coefficients 163, may be communicated by the symbol interpreter 115 to the deblocker 140 via the connection 167. For example, the symbol interpreter 115 may inform the deblocker 140 that a current macroblock does not have any quantized frequency coefficients, and, therefore, no prediction error information may be associated with the current macroblock. In this regard, since the current macroblock may be characterized by good prediction information without any prediction error, the deblocker 140 may skip deblocking the current macroblock.

The picture buffer 150 may be adapted to store one or more decoded pictures comprising deblocked macroblocks received from the deblocker 140 and to communicate one or more decoded pictures to the display engine 145 and to the motion compensator 130. In addition, the picture buffer 150 may communicate a previously decoded picture back to the deblocker 140 so that the deblocker may deblock a current macroblock within a current picture.

A decoded picture buffered in the picture buffer 150 may be communicated via the connection 181 to a display engine 145. The display engine may then output a decoded video stream 183. The decoded video stream 183 may be communicated to a video display, for example. The display engine 145 may comprise a scaler 146, which may be adapted to transform the scaling ratio of a decoded video signal prior to output to a video display, for example.

If the motion compensator 130 is used for temporal prediction of a current macroblock within a current picture, the picture buffer 150 may communicate previously decoded reference picture information to the motion compensator 130 via the connection 177. The previous picture information may be required by the motion compensator 130 to temporally predict a current macroblock within a current picture.

In another aspect of the invention, the symbol interpreter 115, the spatial predictor 120, the ISQDCT 125, the motion compensator 130, the reconstructor 135, the deblocker 140, and the display engine 145, may be hardware accelerators under a control of a CPU, such as CPU 414, for example.

In yet another aspect of the invention, buffering may be used prior to symbol interpreting so that the proper length of the elementary video stream may be communicated to a symbol interpreter. In this regard, a code buffer 105 may buffer the encoded video stream 104 prior to symbol interpretation. After the encoded video stream 104 is buffered, it may be communicated to the symbol interpreter 115 for symbol interpretation.

The symbol interpreter 115 may generate the plurality of quantized frequency coefficients from the encoded video stream. The video stream 104 received by the symbol interpreter 115 may be encoded utilizing CAVLC and/or CABAC. In this regard, the symbol interpreter 115 may comprise a CAVLC interpreter and a CABAC interpreter, for example, which may be adapted to interpret CAVLC and/or CABAC-encoded symbols, respectively. After symbol interpretation, the symbol interpreter may communicate quantized frequency coefficients 163 to the ISQDCT 125, and side information 165 and 161 to the spatial predictor 120 and the motion compensator 130, respectively.

In instances where the encoded video stream 104 comprises temporal prediction mode information, the motion compensator 120 may generate a plurality of temporal prediction pixels 173. In instances where the encoded video stream 104 comprises spatial prediction mode information, the spatial predictor 120 may generate a plurality of spatial prediction pixels 169. The motion compensator 130 may be adapted to receive side information 161 from the symbol interpreter 115. The side information 161 may comprise macroblock partition information, macroblock coding direction information, as well as motion vectors information. For example, the macroblock partition information may correspond to a 16×8, 8×16, 8×8, 4×8, 8×4, and/or a 4×4 partition. In addition, the side information 161 may comprise macroblock coding information. Macroblock coding information within the side information 161 may indicate whether bi-directional coding, for example, was used to encode the macroblocks.

The motion vector information within the side information 161 may comprise motion vector weight information and frame/field duration information. After the side information 161 is communicated to the motion compensator 130, the motion compensator 130 may generate a plurality of temporal prediction pixels. In instances where bi-directional coding was used to encode macroblocks, two prediction blocks, with corresponding motion vector weight information, frame/filed duration information and motion vector information, may be utilized to predict each of the plurality of temporal prediction pixels.

The spatial predictor 120 may be adapted to receive side information 165 from the symbol interpreter 115. The side information 165 may comprise a prediction mode information related to a prediction mode used during spatial prediction. For example, the prediction mode information may comprise a 16×16, an 8×8 or a 4×4 mode information, indicating the size of the macroblock partition used during prediction of the prediction pixels. After receiving the side information 165, the spatial predictor 120 may generate a plurality of spatial prediction pixels. The spatial predictor 120 and the motion compensator 130 may be selected depending on the prediction mode information within the encoded video stream received by the symbol interpreter 115.

The inverse scanner, quantizer and transformer (ISQDCT) 125 may be adapted to receive a plurality of quantized frequency coefficients and generate a prediction error. More specifically, the ISQDCT 125 may generate a prediction error 171 from a plurality of quantized frequency coefficients 163 generated by the symbol interpreter 115 from the encoded video stream 104. After the ISQDCT 125 generates the prediction error 171, the prediction error 171 may be communicated to the reconstructor 135. The reconstructor 135 may also be adapted to receive prediction pixels from either the spatial predictor 120 or the motion compensator 130. For example, the reconstructor 135 may receive spatially predicted pixels 169 or temporally predicted pixels 173. The reconstructor 135 may generate a current macroblock 175 using the prediction error 171 and spatially predicted pixels 169 or temporally predicted pixels 173. In this regard, the reconstructor 135 may generate a macroblock from a plurality of temporal or spatial prediction pixels based on a generated plurality of prediction errors.

After generating a decoded macroblock, 175, the macroblock may be communicated to the deblocker 140. The deblocker 140 may deblock the generated macroblock 175 and mitigate the effects of transform blockiness, for example. The deblocked macroblock may then be buffered by the picture buffer 150. Buffered macroblock information may be subsequently utilized by the motion compensator 130, the deblocker 140 and/or the display engine 145.

In one aspect of the invention the code buffer 105, the context memory block 110 and the picture buffer 150 within the memory core 102 may be integrated on a single chip together with the video decoder core 103. In this manner, both the decoder core 103 and the memory core 102 may be integrated on a single chip. However, other implementations may also be contemplated with regard to the present invention. For example, the memory core 102 may be implemented off-chip as a DRAM, for example. In addition, the code buffer 105, the context memory block 110 and the picture buffer 150 may be implemented separately or within a single off-chip memory.

Figure 2A:
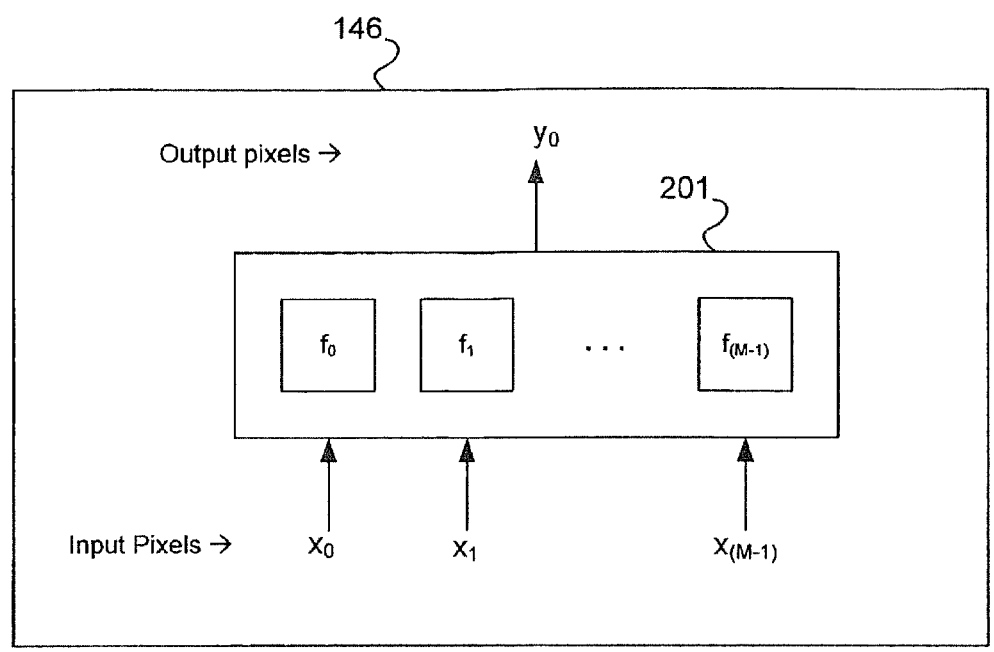
FIG. 2A illustrates a block diagram of an exemplary M-tap filter that may be utilized within a scaler in a video decoder, in accordance with an embodiment of the present invention.

FIG. 2A illustrates a block diagram of an exemplary M-tap filter 201 that may be utilized within a scaler in a video decoder, in accordance with an embodiment of the present invention. The scaler may be, for example, the scaler 146 of FIG. 1. Referring to FIG. 2A, the M-tap filter 201 may receive M number of input pixels, $x_0$ through $x_{(M-1)}$, and may be adapted to generate a single output pixel $y_0$ from the received M number of input pixels. In addition, one or more filters, such as the M-tap filter 201, may be utilized within the scaler 146 of FIG. 1.

In operation, the M-tap filter 201 may generate the output pixel $y_0$ utilizing M number of filter coefficients, $f_0$ through $f_{(M-1)}$. The filter coefficients $f_0$ through $f_{(M-1)}$ may correspond to input pixels $x_0$ through $x_{(M-1)}$, respectively. In this way, the output pixel $y_0$ may be determined as follows:

$$y_0 = x_0 f_0 + x_1 f_1 + \ldots + x_{(M-1)} f_{(M-1)}$$

Figure 2B:
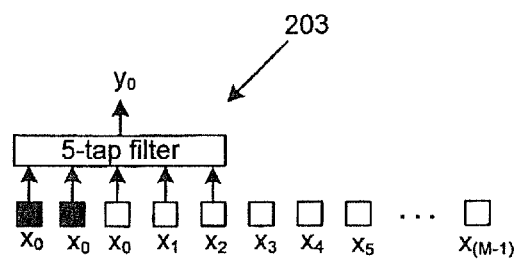
FIG. 2B illustrates a block diagram of an exemplary 5-tap filter adapted to filter replicated input pixels, in accordance with an embodiment of the invention.

FIG. 2B illustrates a block diagram of an exemplary 5-tap filter adapted to filter replicated input pixels, in accordance with an embodiment of the invention. Referring to FIG. 2B, the 5-tap filter 203 may be utilized to filter a plurality of input pixels, $x_0$ through $x_{(M-1)}$, to obtain a plurality of output pixels during scaling.

In an embodiment of the present invention, the center of the 5-tap filter 203 may be aligned with a first input pixel $x_0$. In this way, pixels $x_0$ through $x_2$ may be used by the 5-tap filter 203. However, two additional input pixel positions to the left of input pixel $x_0$ may also be required in order to generate the output pixel $y_0$. The two additional input pixels may be selected by replicating the first input pixel $x_0$. In this way, the input pixel $x_0$ may be used three times in the following calculation of the output pixel $y_0$:

$$y_0 = x_0 f_0 + x_0 f_1 + x_0 f_2 + x_1 f_3 + x_2 f_4$$

In another embodiment of the present invention, the 5-tap filter 203 may be utilized to filter decoded replicated input pixels and to generate one or more output pixels within a scaler. For example, the 5-tap filter 203 may be utilized within the scaler 146 of FIG. 1.

Figure 2C:
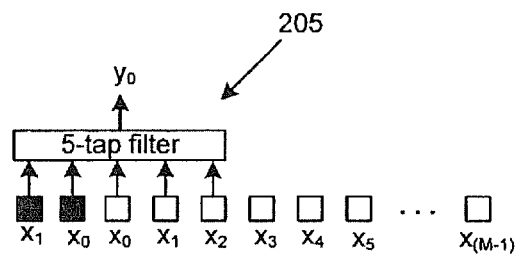
FIG. 2C illustrates a block diagram of an exemplary 5-tap filter adapted to filter mirrored input pixels, in accordance with an embodiment of the invention.

FIG. 2C illustrates a block diagram of an exemplary 5-tap filter adapted to filter mirrored input pixels, in accordance with an embodiment of the invention. Referring to FIG. 2C, the 5-tap filter 205 may be utilized to filter a plurality of input pixels, $x_0$ through $x_{(M-1)}$, to obtain a plurality of output pixels during scaling.

In another embodiment of the present invention, the center of the 5-tap filter 205 may be aligned with a first input pixel $x_0$. In this way, the 5-tap filter 205 may use pixels x0 through $x_2$. However, two additional input pixel positions to the left of input pixel $x_0$ may also be used to generate the output pixel $y_0$. The two additional input pixels may be selected by mirroring the first two input pixels, $x_0$ and $x_1$. In this way, each of the input pixels $x_0$ and $x_1$ may be used two times in the following calculation of the output pixel $y_0$:

$$y_0 = x_1 f_0 + x_0 f_1 + x_0 f_2 + x_1 f_3 + x_2 f_4$$

In yet another embodiment of the present invention, the 5-tap filter 205 may be utilized to filter decoded mirrored input pixels and to generate one or more output pixels within a scaler. For example, the 5-tap filter 205 may be utilized within the scaler 146 of FIG. 1.

Figure 2D:
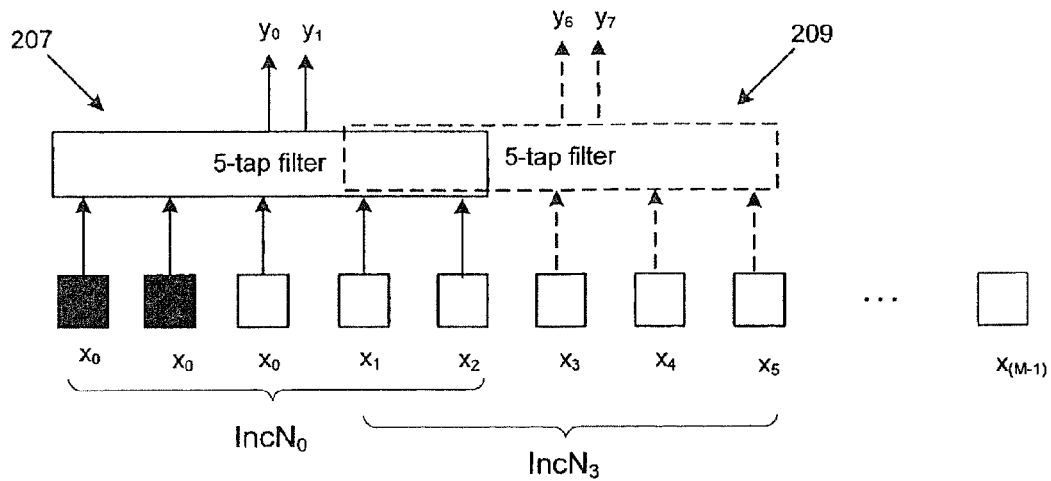
FIG. 2D illustrates a block diagram of exemplary output pixel generation for 1:2 scaling ratio utilizing a 5-tap filter, in accordance with an embodiment of the invention.

FIG. 2D illustrates a block diagram of exemplary output pixel generation for 1:2 scaling ratio utilizing a 5-tap filter, in accordance with an embodiment of the invention. Referring to FIG. 2D, a 5-tap filter 207 may be utilized to filter a plurality of input pixels $x_0$ through $x_{(M-1)}$ with a scaling ratio 1:2. For a 1:2 scaling ratio, the 5-tap filter 207 may generate two output pixels for each input pixel. For example, output pixels $y_0$ and $y_1$ may correspond to the input pixel $x_0$. Since the filter 207 is a 5-tap filter, mirroring or replicating may be applied in order to generate two additional input pixels to the left of input pixel $x_0$, when the filter 207 is centered on input pixel $x_0$.

During output pixel generation, the 5-tap filter may "slide" along the input pixels and two corresponding output pixels may be generated for each input pixel. For example, the 5-tap filter 209 may be centered at input pixel $x_3$. Corresponding output pixels $y_6$ and $y_7$ may be generated utilizing input pixels $x_1$ through $x_5$.

In an embodiment of the present invention, an increment value table and a filter coefficient table may be utilized to simplify the scaling process and improve scaling accuracy and efficiency. Referring again to FIG. 2D, as filter 207 "slides" along the input pixels, an increment value IncN may be utilized to determine which input pixels may be used to generate the corresponding two output pixels. In this way, increment value $IncN_0$ may indicate that input pixels $\{x_0; x_0; x_0; x_1; x_2\}$ may be used to generate output pixels $y_0$ and $y_1$. Similarly, with regard to filter 209, $IncN_3$ may indicate that input pixels $\{x_1; x_2; x_3; x_4; x_5\}$ may be used to generate output pixels $y_6$ and $y_7$.

Corresponding filter coefficients used in the calculation of each of $y_0$, $y_1$, $y_6$ and $y_7$, may be obtained from a filter coefficient table. For example, output pixels $y_0$ and $y_1$ may be calculated using the same input pixels $\{x_0; x_0; x_0; x_1; x_2\}$ but with different filter coefficients. More specifically, $y_0$ and $y_1$ may be calculated as follows:

$$y_0 = x_0 f_{01} + x_0 f_{02} + x_0 f_{03} + x_1 f_{04} + x_2 f_{05}; \text{ and}$$

$$y_1 = x_0 f_{11} + x_0 f_{12} + x_0 f_{13} + x_1 f_{14} + x_2 f_{15}$$

Each of the filter coefficients may be represented in the form $f_{(N-1)T}$, where (N−1) may correspond to the total number of phases for each set of output pixels, and T may correspond to the total number of taps for the scaling filter, as further explained below with regard to FIG. 3A.

In another embodiment of the present invention, an increment value table and a filtering coefficient table may be determined prior to any scaling of input pixels. In addition, an increment value table and a filter coefficient table may also be generated on the fly, during scaling. Since the increment values and the filter coefficients may be related to the scaling ratio, each time the scaling ratio changes within a scaler, the increment value table and the filter coefficient table may be updated.

Although a 5-tap filter may be utilized during scaling with a scaling ratio of 1:2, the invention is not limited in this manner. Other filters/scalers with a different number of inputs and/or taps may be utilized. In addition, a more general scaling ratio of M:N may be utilized so that any tap filter may be used to scale M number of input pixels into N number of output pixels. Therefore, filter coefficient tables and increment value tables may be generated for each scaling ratio and corresponding filter coefficients and increment values may be used to generate the N number of output pixels from the M number of input pixels. For each M:N scaling ratio, the number of output pixels N may also correspond to a number of phases for the output pixels. For example, for a scaling ratio of 1:2, or N=2, there may be two phases within the output pixels. In other words, there may be two output pixels corresponding to each input pixel. Similarly, for an M:N scaling ratio, there may be a total of N phases within the output pixels, or a total N number of output pixels corresponding to M number of input pixels.

In another embodiment of the present invention, the 5-tap filter 207 may be utilized to filter decoded pixels replicated input pixels and to generate one or more output pixels within a scaler where a 1:2 scaling ratio may be required. However, the 5-tap filter 207 may be utilized within a scaler where a different scaling ratio may be required. In addition, a filter with different number of taps may also be utilized within such scaler. For example, the 5-tap filter 207 may be utilized within the scaler 146 of FIG. 1 to generate one or more output pixels.

Figure 3A:
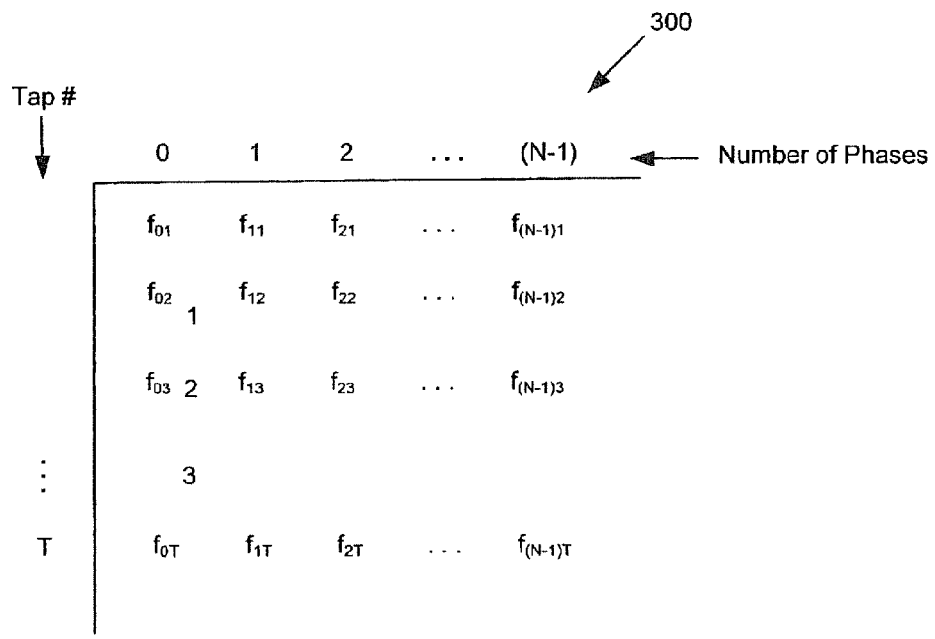
FIG. 3A illustrates an exemplary filter coefficient table that may be utilized in accordance with an embodiment of the present invention.

FIG. 3A illustrates an exemplary filter coefficient table 300 that may be utilized in accordance with an embodiment of the present invention. Referring to FIG. 3A, filter coefficients $f_{01}$ through $f_{(N-1)T}$ may be used during scaling, where a T-tap filter is utilized to generate output pixels with N number of phases. In this way, the filter coefficient table 300 may be used to calculate the T-tap filter outputs for any scaling ratio of M:N and for any number of taps used, up to a total of T number of taps. The filter coefficient table 300 may be pre-determined, for example, or it may be updated on the fly if the applicable scaling ratio M:N changes.

In an embodiment of the present invention, the filter coefficients may be determined on the fly for any arbitrary scaling factor. The filter coefficients may be generated by sampling a sine function. A scaling ratio of M:N and T taps may be utilized with a set of inputs. The filter may as a result consist of N phases for T taps, or N*T coefficients, which may be represented by $$f_{(N-1)T} = \text{Filter}[N][T]$$

Based on N and T, a sine function may be sampled at an appropriate frequency to yield the associated number of coefficients. A windowed version of a sine function may be utilized, where the windowing may provide smoothing to the sine function.

$$\text{SINC\_function} = SINC\left(j - \frac{M}{N}i\right) \cdot \text{window}$$

$$= \frac{\sin\left(j - \frac{M}{N}i\right) * \pi}{\left(j - \frac{M}{N}i\right) * \pi} \cdot \text{window}$$

where, j=0, . . . , T−1, and i=0, . . . , N−1.

Figure 3B:
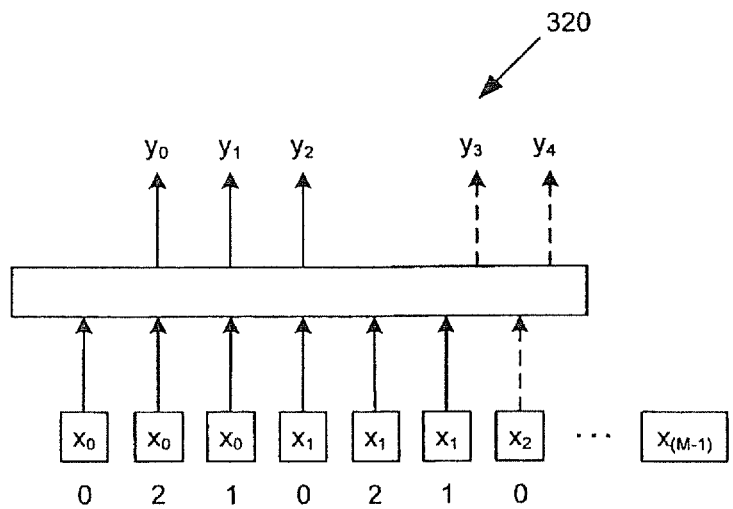
FIG. 3B illustrates an exemplary 2:3 scaling, in accordance with an embodiment of the present invention.

The resulting filters may be ordered based on phase. However, in a real scaling operation, each output pixel may be generated in an order that may be different from the sequential phase ordering. FIG. 3B illustrates an exemplary 2:3 scaling 320, in accordance with an embodiment of the present invention. Referring to FIG. 3B, it shows the output ordering, pixels y0, y1, y2, y3, y4, . . . , may have a phase ordering of 0, 2, 1, 0, 2, 1, . . . . To further reduce implementation complexity, the filters and table increments associated with the filter may be re-ordered based on the output ordering rather than phase ordering. This may be accomplished by utilizing a N-entry mapping table of output pixel position and phase. The resulting function may then be sampled based on the number of taps needed. The sine function may be calculated and sampled on the spot.

Referring again to FIG. 1, a filter coefficient table, such as the filter coefficient table 300 of FIG. 3A, may be utilized in accordance with the scaler 146 within the decoder 100. For example, the filter coefficient table 300 may be utilized to calculate T-tap filter outputs of filters within the scaler 146 for any scaling ratio of M:N and for any number of taps used, up to a total of T number of taps per filter.

Figure 3C:
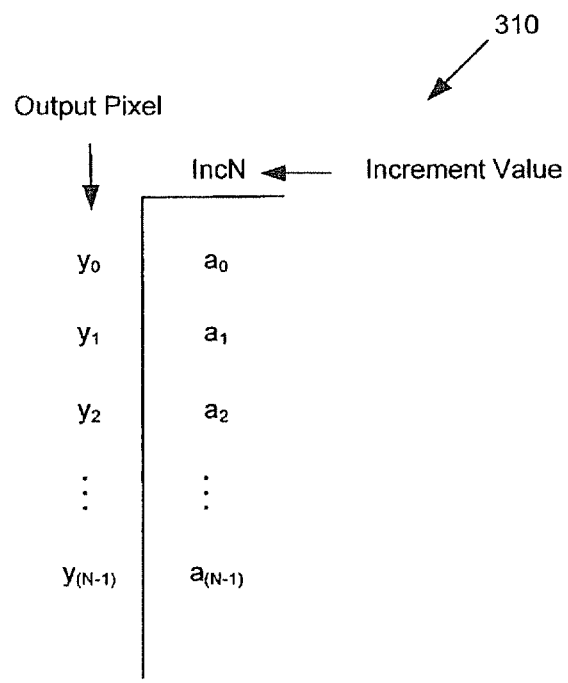
FIG. 3C illustrates an exemplary increment value table that may be utilized in accordance with an embodiment of the present invention.

FIG. 3C illustrates an exemplary increment value table 310 that may be utilized in accordance with an embodiment of the present invention. The increment value table 310 may comprise a plurality of values $a_0$ through $a_{N-1}$, corresponding to a plurality of output pixels $y_0$ through $y_{(N-1)}$, respectively. Each of the increment values $a_i$, may indicate which input pixels may be used to generate the corresponding output pixel $y_i$.

In an embodiment of the present invention, each increment value $a_i$ within the increment value table 310 may be used to indicate how many input pixels from a previous output pixel calculation may be re-selected and how many input pixels from the same previous pixel calculation may be de-selected.

Referring again to FIG. 1, an increment value table, such as the increment value table 310 FIG. 3C, may be utilized in accordance with the scaler 146 within the decoder 100. For example, the increment value table 310 may be utilized to indicate how many input pixels within the scaler 146 from a previous output pixel calculation may be re-selected and how many input pixels from the same previous pixel calculation may be de-selected during deblocking within the scaler 146.

Figure 4A:
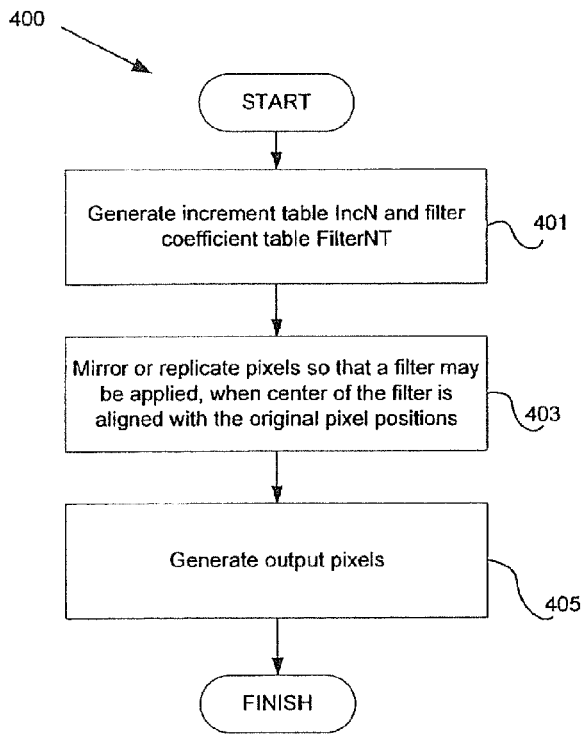
FIG. 4A illustrates a flow diagram of an exemplary method for processing a plurality of pixels, in accordance with an embodiment of the present invention.

FIG. 4A illustrates a flow diagram of an exemplary method 400 for processing a plurality of pixels, in accordance with an embodiment of the present invention. Referring to FIG. 4A, at 401, an increment value table and a filter coefficient table may be generated. The increment value table and the filter coefficient table may be either pre-computed and stored for all desired scaling factors, or they may be generated on the fly based on a current desired scaling factor, or a combination of the above two approaches. In this way, storage capacity within a decoder may be increased, while numerous scaling factors may be supported. In addition, customized filters may be used for improved picture quality. At 403, input pixels may be mirrored or replicated with enough pixels so that a filter may be applied when the center of the filter is aligned with the original pixel positions. At 405, the output pixels may be generated.

Figure 4B:
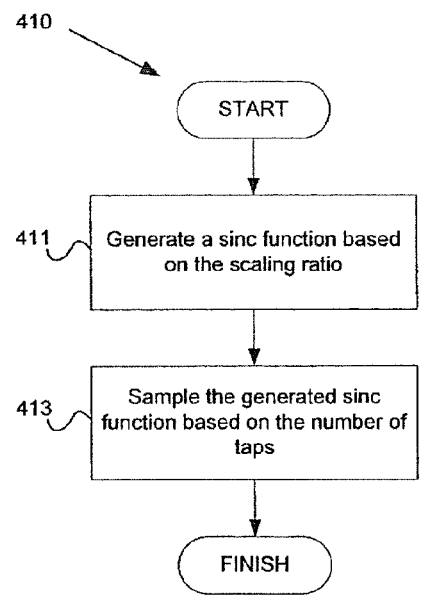
FIG. 4B illustrates a flow diagram of an exemplary method for generating filter coefficients, in accordance with an embodiment of the present invention.

FIG. 4B illustrates a flow diagram of an exemplary method 410 for generating filter coefficients, in accordance with an embodiment of the present invention. Referring to FIG. 4B, at 411, a sine function may be generated based on an arbitrary scaling ratio M:N. The generated sine function may then be sampled based on the number of taps T to determine the filter coefficients. The method 410 may be performed on the fly.

In another embodiment of the present invention, a picture may be scaled independently in a horizontal and/or a vertical direction. Referring again to FIG. 1, to scale a line of x pixels into y pixels with a scaling factor of M to N, the display engine 145 may be adapted to perform the following exemplary operations indicated by the following pseudo code:

```
for (i=0; i<x/N; i++)
{
        for (j=0; j<N; j++)
        {
                p = filter[j];
                *output = 0;
                for(k=0; k<T; k++)
                {
                        *output += p[k] *input[k];
                }
                input += inc[j];
                output ++;
        }
}
for (i=0; i<x%N; i++)
{
        for (j=0; j<N; j++)
        {
                p = filter[j];
                *output = 0;
                for(k=0; k<T; k++)
                {
                        *output += p[k] *input[k];
                }
                input += inc[j];
                output ++;
        }
}
```

Figure 5:
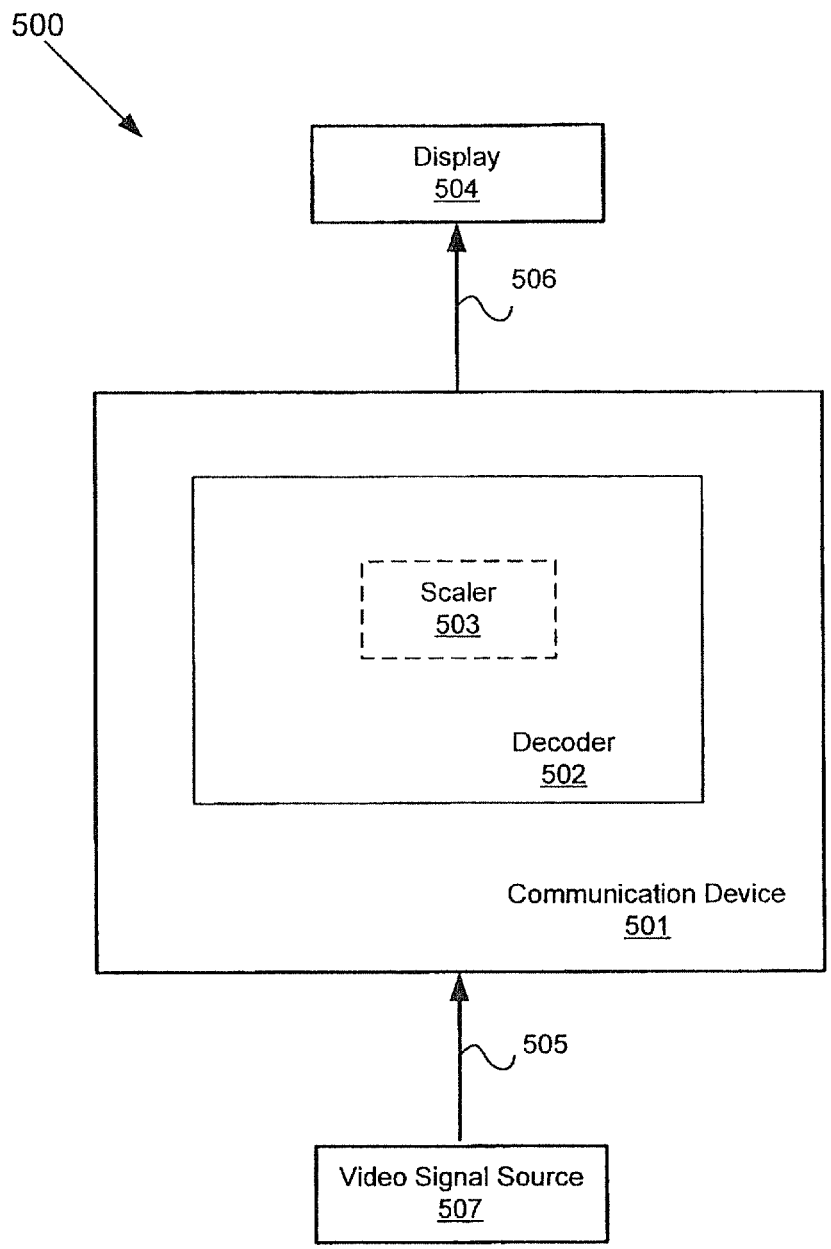
FIG. 5 illustrates a block diagram of an exemplary video signal processing system that may be utilized in accordance with an embodiment of the invention.

FIG. 5 illustrates a block diagram of an exemplary video signal processing system 500 that may be utilized in accordance with an embodiment of the invention. Referring to FIG. 5, the video signal processing system 500 may comprise a video signal source 507, a communication device 501 and a display 504. The communication device 501 may comprise, for example, a set top box, a desktop computer, a notebook computer, a handheld computer such as, for example, a PDA, a cellular telephone, or the like, or a combination thereof.

The video signal source 507 may comprise a video encoder and may be adapted to generate an elementary video stream 505. The video signal source 507 may utilize one or more video encoding standards, such as MPEG-4, for example, and may be implemented as a video head end, for example. The video signal source 507 may communicate the elementary video stream 505 to the communication device 501 for further processing, including decoding of the elementary video stream 505. The video signal source 507 may be connected to the communication device 501 via a wired and/or a wireless connection.

The communication device 501 may comprise suitable circuitry, logic and/or code and may be adapted to process an elementary video stream 505. For example, the communication device 501 may comprise a decoder 502 and may be adapted to decode the elementary video signal 505 to generate a decoded video signal 506. The communication device 501, when implemented as a set top box, may be implemented as a cable set top box, a satellite receiver box and/or a digital antenna tuner, for example.

In one aspect of the invention, the communication device 501 may comprise a decoder 502, such as the decoder 100 of FIG. 1. The decoder 502 may be adapted to decode the elementary video stream 505 and to deblock decoded macroblocks within the decoded video stream. For example, the decoder 502 may comprise a scaler 503, such as the scaler 146 of FIG. 1. The scaler 503 may be adapted to scale a decoded video stream utilizing a determined scaling ratio prior to communicating the decoded signal to the display 504.

After the elementary video stream 505 is decoded, the decoded video signal 506 may be communicated to a display 504 for further processing. The display 504 may be implemented within a television or computer monitor, or integrated with the communication device 501 itself, for example, and may be adapted to display the decoded video signal 506.

Figure 6:
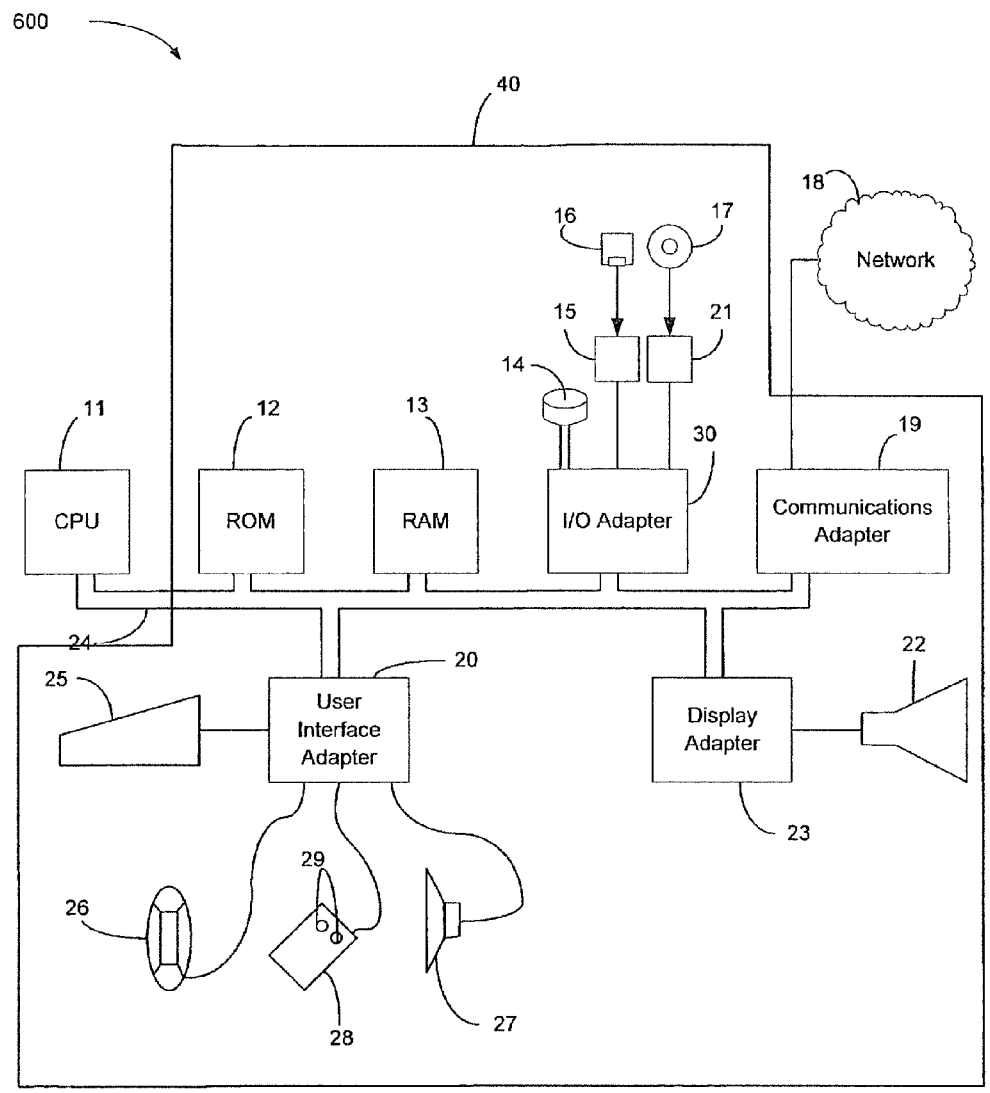
FIG. 6 illustrates an exemplary computer system, in accordance with an embodiment of the present invention.

FIG. 6 illustrates an exemplary computer system 600, in accordance with an embodiment of the present invention. The computer system 600 may comprise a central processing unit (CPU) 11 and a computer system core 40. The computer system core 40 may comprise a random access memory (RAM) 13, a read only memory (ROM) 12, an input/output (I/O) adapter 30, a user interface adapter 20, a communications adapter 19, and a display adapter 23. One or more elements of the computer system core 40 may be implemented on a single chip. The CPU 11 may comprise a processor integrated outside the computer system core 40. For example, the CPU 11 may be integrated as a host processor outside the computer system core 40.

The I/O adapter 30 may connect to a bus 24 peripheral devices, such as hard disk drives 14, magnetic disk drives 15 for reading removable magnetic disks 16, and/or optical disk drives 21 for reading removable optical disks 17, such as a compact disk or a digital versatile disk. The user interface adapter 20 may connect to the bus 24 devices such as a keyboard 25, a mouse 28 having a plurality of buttons 29, a speaker 27, a microphone 26, and/or other user interface devices, such as a touch screen device (not shown). The communications adapter 19 may connect the computer system 500 to a data processing network 18. The display adapter 23 may connect a monitor 22 to the bus 24.

In one aspect of the invention, a scaler within a decoder, such as the scaler 146 within the decoder 100 of FIG. 1, may be implemented as a computer system, such as the computer system 600 of FIG. 6. The computer system 600 may be utilized for processing a plurality of pixels. For example, the CPU 11 may acquire a plurality of increment values that correspond to a plurality of output pixels from an increment value table. The CPU 11 may also acquire a plurality of filter coefficients that correspond to the plurality of output pixels from a filter coefficient table. The CPU 11 may then generate the plurality of output pixels utilizing the plurality of increment values acquired from the increment value table and the plurality of filter coefficients acquired from the filter coefficient table. The CPU 11 may filter the plurality of pixels utilizing the acquired plurality of increment values and the acquired plurality of filter coefficients. The CPU 11 may generate the increment value table and the filter coefficient table. Pre-determined increment value tables and filter coefficient tables may be stored in ROM 12 and subsequently moved to RAM 13.

The generation of the increment value table and the filter coefficient table may occur during the generation of the output pixels. The increment value table and the filter coefficient table may be generated prior to the generation of the output pixels. Phase information within each of the acquired plurality of filter coefficients may correspond to a scaling ratio value. If the scaling ratio value changes, the CPU 11 may update the increment value table and the filter coefficient table. The CPU 11 may select at least a portion of the plurality of pixels for the estimation utilizing at least one of the acquired plurality of increment values. If the selected portion of the plurality of pixels is insufficient for the estimation, the CPU 11 may mirror and/or replicate at least one pixel from the plurality of pixels.

An exemplary embodiment of the invention may be implemented as sets of instructions resident in the RAM 13 of one or more computer systems 600 configured generally as described in FIG. 6. Until required by the computer system 600, the sets of instructions may be stored in another computer readable memory, for example on a hard disk drive 14, or in a removable media or other memory, such as an optical disk 17 for eventual use in an optical disk drive 21, or in a magnetic disk 16 for eventual use in a magnetic disk drive 15. The physical storage of the sets of instructions may physically change the medium upon which it is stored electrically, magnetically, or chemically, so that the medium carries computer readable information.

Accordingly, aspects of the present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that processes a plurality of pixels, the method comprising:
   acquiring a scaling factor associated with a plurality of output pixels; and generating filter coefficients that correspond to the plurality of output pixels during the generation of the plurality of output pixels, wherein the generating filter coefficients is performed by a processor, wherein the generating filter coefficients that correspond to the plurality of output pixels occurs during scaling of the plurality of output pixels, and further wherein the generating filter coefficients that correspond to the plurality of output pixels occurs during processing of a multi-tap filter.

2. The method according to claim 1 further comprising generating the plurality of output pixels utilizing the plurality of pixels.

3. The method according to claim 2 further comprising filtering the plurality of pixels utilizing the generated filter coefficients.

4. The method according to claim 1 wherein the plurality of pixels comprise video data.

5. A system that processes a plurality of pixels, the system comprising:
   at least one processor capable of acquiring a scaling factor associated with a plurality of output pixels; and
   the at least one processor capable of generating filter coefficients that correspond to the plurality of output pixels during the generation of the plurality of output pixels, wherein the generating filter coefficients that correspond to the plurality of output pixels occurs during scaling, and further wherein the generating filter coefficients that correspond to the plurality of output pixels occurs during processing of a multi-tap filter.

6. The system according to claim 5 further comprising the at least one processor capable of generating the plurality of output pixels utilizing the plurality of pixels.

7. The system according to claim 5 further comprising the at least one processor capable of filtering the plurality of pixels utilizing the generated filter coefficients.

8. A non-transitory machine-readable storage having stored thereon, a computer program having at least one code section that processes a plurality of pixels, the at least one code section being executable by a machine for causing the machine to perform steps comprising: acquiring a scaling factor associated with a plurality of output pixels; and generating filter coefficients that correspond to the plurality of output pixels during the generation of the plurality of output pixels, wherein the generating filter coefficients that correspond to the plurality of output pixels occurs during scaling and after decoding, and further wherein the generating filter coefficients that correspond to the plurality of output pixels occurs during processing of a multi-tap filter.

9. The method according to claim 1 wherein the generating filter coefficients that correspond to the plurality of output pixels occurs during deblocking.

10. The method according to claim 1 wherein the generating filter coefficients that correspond to the plurality of output pixels occurs after decoding.

11. The method according to claim 1 wherein a filter coefficient table is updated when a scaling ratio changes during scaling.

12. The system according to claim 5 wherein the generating filter coefficients that correspond to the plurality of output pixels occurs after decoding.

13. The system according to claim 5 wherein a filter coefficient table is updated when a scaling ratio changes during scaling.

14. The machine-readable storage according to claim 8 wherein a filter coefficient table is updated when a scaling ratio changes during scaling.

15. The method according to claim 1 wherein the generating filter coefficients that correspond to the plurality of output pixels occurs during processing of a multi-tap sinc function.

16. The system according to claim 5 wherein the generating filter coefficients that correspond to the plurality of output pixels occurs during processing of a multi-tap sinc function.

17. The machine-readable storage according to claim 8 wherein the generating filter coefficients that correspond to the plurality of output pixels occurs during processing of a multi-tap sinc function.

* * * * *